United States Patent [19]

Feeney et al.

[11] 4,060,503

[45] Nov. 29, 1977

[54] ADHESIVE COMPOSITION

[75] Inventors: George W. Feeney, Akron; Bruce W. Habeck, Cuyahoga Falls, both of, OH

[73] Assignee: The Goodyear Tire & Rubber Company, Akron, Ohio

[21] Appl. No.: 758,264

[22] Filed: Jan. 10, 1977

Related U.S. Application Data

[63] Continuation of Ser. No. 552,688, Feb. 24, 1975, abandoned.

[51] Int. Cl.² ............................................. C08L 7/00
[52] U.S. Cl. .................................... 260/5; 260/28.5 B; 260/33.6 A; 260/33.6 AQ; 260/33.6 UA; 260/876 B; 260/887; 260/888; 260/894; 427/207 B; 427/316; 526/339
[58] Field of Search ................. 260/5, 28.5 B, 33.6 A, 260/33.6 AR, 33.6 UA, 876 B, 887, 888, 894

[56] References Cited

U.S. PATENT DOCUMENTS

| | | | |
|---|---|---|---|
| 3,441,530 | 4/1969 | Bauer | 260/33.6 |
| 3,784,530 | 1/1974 | Osborn et al. | 260/894 |
| 3,846,352 | 1/1974 | Bullard et al. | 260/894 |

*Primary Examiner*—J. Ziegler
*Attorney, Agent, or Firm*—F. W. Brunner; H. C. Young, Jr.

[57] ABSTRACT

An adhesive composition which comprises an admixture of at least one of natural rubber and synthetic rubbers with a tackifying resin containing carbon-to-carbon unsaturation therein prepared by reacting in the presence of an aliphatic solvent and a catalyst selected from aluminum chloride and ethyl aluminum dichloride a monomer mixture comprised of about 88 to about 98 weight percent of a selected diolefin/olefin mixture and, correspondingly, about 12 to about 2 weight percent α-methyl styrene. Said adhesive composition has particular utility for use as a pressure sensitive adhesive.

8 Claims, No Drawings

ADHESIVE COMPOSITION

This is a Continuation of application Ser. No. 552,688 filed 2-24-75, now abandoned.

The invention relates to tackified elastomers and to methods for their preparation. While the invention is not restricted thereto, it has particular reference to pressure-sensitive adhesives.

Various adhesives can advantageously be used as pressure-sensitive, laminating and hot melt adhesives. Most are generally known for their ability to form bonded laminated articles and some are more particularly known as pressure-sensitive adhesives and some as hot melt adhesives.

Pressure-sensitives adhesives and adhesive-coated masking tapes and the like are well-known. These products commonly contain natural rubber and a thermoplastic tackifier resin compatible therewith. The adhesive, coated on a flexible backing to form a tape, is tacky at normal room temperatures and adheres instantly and tightly to surfaces against which it is pressed without requiring moistening or heating. It typically is required to have a satisfactory balance of cohesive and adhesive strength to provide a good rolling ball tack shear strength and 180° peel strength in order to be commerically useful.

Heretofore, adhesive compositions have been prepared, for example, by mixing a rubber such as rubbery unvulcanized block copolymers, derived from 1,3-butadiene or isoprene with styrene, as polymer blocks, with tackifying resins, for example, derived from diolefin/olefin mixtures such as those primarily characterized by a principal backbone of piperylene and 2-methyl-2-butene.

However, such adhesive compositions have had insufficient tack for many commercial adhesive applications. Pressure sensitive adhesives demand a tailored balance of cohesive and adhesive forces to yield effective shear, peel and tack values normally uncommon to ordinary building-tack rubbery materials. Simply increasing the 2-methyl-2-butene, or decreasing the piperylene, content of the backbone has been found to require relatively large increases or decreases.

Therefore, it is an object of this invention to provide tackified elastomers and tackified elastomers having adhesive properties.

In accordance with this invention, it has been discovered that an adhesive composition comprises a mixture of (1) about 100 parts by weight of a rubber primarily selected from at least one of natural cis-1,4-polyisoprene rubber, synthetic cis-1,4-polyisoprene elastomer, and an unvulcanized elastomeric block copolymer having the general configuration A - B - A wherein each A is an independently selected nonelastomeric styrene polymer block having an average molecular weight of about 2,000 to about 100,000 and a glass transition temperature above about 25° C, the total block A content being from about 10 to about 50 percent by weight of the copolymer, and B is an elastomeric conjugated diene polymer block of a diene selected from the monomer of isoprene having an average molecular weight from about 25,000 to about 1,000,000 and a glass transition temperature below about 10° C, said copolymer having a tensile strength at 25° C in excess of about 200 pounds per square inch, and (2) about 60 to about 140 parts by weight of a compatible, thermoplastic tackifying resin containing carbon-to-carbon unsaturation therein prepared by the method which comprises reacting in the presence of an aliphatic hydrocarbon solvent and a catalyst selected from aluminum chloride and ethyl aluminum dichloride, a monomer mixture comprised of 92 to about 99 weight percent of a diolefin/olefin mixture of a weight ratio in the range of about 0.6/1 to about 1.4/1 and, correspondingly, about 8 to about 1, preferably about 6 to about 2, weight percent α-methyl styrene, where said diolefin comprises at least about 95 weight percent piperylene and up to about 5 weight percent isoprene based on the diolefin, and where said olefin comprises at least one olefin selected from 2-methyl-2-butene, 2-methyl-1-butene, 2-methyl-2-pentene and 2-methyl-1-pentene, preferably at least about 90 weight percent 2-methyl-2-butene, based on the olefin.

In further practice of this invention, in order to provide effective enhancement of the tack by the α-methyl styrene, it is often desired that, as the amount of α-methyl styrene increases, the diolefin/olefin ratio increases. Thus, for example, as α-methyl styrene increases from 1 percent to 8 percent, the diolefin/olefin ratio should correspondingly increase about 0.6/1 to about 1.4/1. In this regard, it is preferred that the amount of α-methyl styrene ranges from 2 to about 6 weight percent and the diolefin/olefin ratio correspondingly ranges from about 0.8/1 to about 1.4/1.

The thermoplastic tackifying resins for the adhesive of this invention can be characterized generally by having a softening point in the range of about 80° C to about 105° C according to ASTM Method E 28-58 T, although they can typically have a softening point of about 85° C to about 105° C with vigorous steam stripping to remove low molecular weight materials including dimers, trimers and tetramers. The resins typically have good heat stability, a specific gravity at about 0.85 to about 1.0, an acid number at less than about 1.0 and a Gardner color in the range of about 4 to about 10.

Adhesive compositions of this invention can conveniently be prepared by mixing the tackifying resin with the elastomeric block copolymer in the presence of volatile organic hydrocarbon solvents at various temperatures such as from about 0° C to about 100° C and typically from about 20° C to about 60° C but above the freezing point of the mixture and below its boiling point. Various aliphatic and aromatic hydrocarbons can be used. Representative examples of such aromatic hydrocarbons are toluene and benzene and representative examples of aliphatic hydrocarbons are pentane, hexane, heptane and octane. A particularly suitable hydrocarbon solvent is a mixture containing from about 10 to about 90 parts of toluene and correspondingly from about 90 to about 10 parts of hexane. This adhesive mixture is then suitable for bonding substrates such as by simply applying it to the substrate surfaces, drying it, and contacting the said substrate surfaces with the adhesive mixture therebetween and drying the said adhesive.

The mixture has particular utility as a pressure-sensitive adhesive. For example, pressure-sensitive tapes can easily be prepared by applying the solution of the adhesive mixture to a flexible substrate and drying the mixture. The adhesive of this invention also has utility as a hot melt pressure-sensitive adhesive, particularly when prepared by mixing the elastomeric block copolymer, the hydrocarbon tackifying resin and a minor amount of an oil such as a petroleum derived or coal tar derived oil or with liquid or low softening point resins. Particularly suitable is mineral oil. The hot melt adhesive is simply applied by heating the mixture, applying it to a substrate and cooling. After cooling, it is surprisingly found that the adhesive has good pressure-sensitive properties.

In the preparation of the adhesives of this invention, it is understood that minor amounts of various antioxidants and fillers can be added and mixed therewith in order to further improve its aging characteristics and various physical properties.

The compatible tackifying resin required for the admixture of this invention is prepared by reacting the manipulated monomers in the presence of an aliphatic solvent, and aluminum chloride or ethyl aluminum dichloride, at a temperature in the range of about 0° C to about 100° C, preferably in the range of about 10° C to about 50° C. The reaction can be conducted batch-wise or as a continuous process. The reaction can be conducted at atmospheric pressure or above or below atmospheric pressure. Generally, the autogenous pressure developed by the reaction can be used.

Representative of various aliphatic solvents are saturated hydrocarbons containing 3 to about 8 carbon atoms, representative of which are n-butane, isobutane, n-pentane, isopentane, n-hexane, isohexane, n-heptane and isoheptane. Hexane and heptane are preferred. It is understood that unreacted hydrocarbons in the polymerization mixture can also act as a solvent. Generally sufficient solvent is used to provide a solution containing 70 weight percent monomers or resin, although higher or lower concentrations can usually be used.

Generally the reaction can be conducted over a period of time in the range of about 30 to about 120 minutes, although shorter or longer times can be used.

The resin is generally recovered by deactivating the catalyst with a material selected from an alcohol, such as methanol, isopropanol and butanol and/or lime, filtering the product and steam stripping the filtrate to remove volatiles. Then the resin can be mixed with the elastomer as a tackifier.

The tackifying resin can be modified by the addition of up to about 15, preferably up to about 10, weight percent of piperylene dimers or piperylene trimers or other unsaturated hydrocarbons, particularly hydrocarbons containing from 4 to 6, preferably 5 to 6, carbon atoms to the monomer mixture. Representative examples of such reactive hydrocarbons, in addition to 2-methyl-2-butene, are 2-methyl-1-butene, 2,3-dimethyl-1-butene, 2,3-dimethyl-2-butene, 2-methyl-1-pentene, 2-methyl-2-pentene, cyclopentene and 1,3-cyclopentadiene. Various other, essentially unreactive, unsaturated hydrocarbons can be present such as 1-pentene, 2-pentene, 3-methyl-2-pentene, 4-methyl-1-pentene, 3-methyl-2-pentene, 4-methyl-2-pentene, 2-hexene, 3,3-dimethyl-1-butene and cyclohexene.

The resins for the adhesives of this invention can typically be further characterized by being generally soluable in aliphatic hydrocarbons such as pentane, hexane and heptane and in aromatic hydrocarbons such as benzene and toluene. It is to be understood that these resins can have their composition modified, while maintaining their characterizations, by containing up to about 15 weight percent derived from the said piperylene dimers, piperylene trimers and other unsaturated hydrocarbons containing from 4 to 6, preferably 5 to 6, carbon atoms based on the total resin.

An unvulcanized elastomeric block copolymer used in this invention comprises nonelastomeric terminal polymer blocks and internal elastomeric polymer blocks. The characteristics of the internal or middle block, which is elastomeric, may be that expressed in ASTM Special Technical Bulletin No 184 as follows: "A substance that can be stretched at room temperature to at least twice its original length and, after having been stretched and the stress removed, returns with force to approximately its original length in a short time."

The terminal nonelastomeric blocks constitute polymeric blocks which do not meet this definition. Furthermore, the difference between glass transition temperatures of the end blocks and middle blocks should be at least 40° C and preferably at least 100° C.

Typically, the unvulcanized elastomeric copolymers can be prepared by first polymerizing styrene with a lithium based initiator. A suitable lithium based initiator is, for example, lithium metal, alkyl lithium compounds, lithium hydrocarbyls and organo lithium amides. The alkyl lithium compounds are preferred. Particularly preferred alkyl lithium compounds are branched chain, preferably secondary alkyl lithiums. Such alkyl lithium compounds especially include secondary butyl lithium, isobutyl lithium, isoamyl lithium and secondary amyl lithium.

After polymerizing this monomer to an average molecular weight of from about 2000 to about 100,000, and preferably from about 5000 to about 30,000, isoprene and additional amounts of styrene are added to the polymerization mixture.

The polymerization is then continued to provide an elastomeric middle block polymer of isoprene having an average molecular weight of from about 25,000 to about 1,000,000 and more preferably between about 50,000 and about 500,000, followed by a nonelastomeric block polymer of styrene.

Typically inert hydrocarbon solvents are aliphatic hydrocarbons (including cycloaliphatic) such as cyclohexane and a typical aromatic hydrocarbon is benzene. Usually the amount of initiator should be maintained as low as possible, but may be varied over a relatively wide range such as from about 1 to about 200 parts per million, based on the weight of the monomers present.

The following examples further illustrate the invention and are not intended to be limiting. In these examples, all parts and percentages are by weight unless otherwise indicated. Examples I typifies the tackifying resin and Example II illustrates the adhesive composition.

EXAMPLE I

A series of experiments were conducted, identified herein as Experiments A–E. In these experiments, 100 parts of heptane and about 3 parts of particulate aluminum were charged to the individual reactors, labeled A to E. While continuously stirring the mixture, 200 parts of a hydrocarbon mixture were slowly added to the reactor over a period of about 90 minutes. The hydrocarbon mixture was comprised of piperylene, 2-methyl-2-butene and α-methyl styrene.

The temperature of the reaction was maintained in a range of about 25° C to 30° C. After about an hour of agitation from the time of final addition of the hydrocarbon mixture, approximately 5 parts water and 20 parts lime, hydrated calcium hydroxide, were added to neutralize and decompose the aluminum chloride. The mixture was filtered to remove particles of decomposed aluminum chloride and lime.

The filtrate was steam distilled to a pot temperature of about 235° C. The resulting residual molten resin was poured from the pot onto an aluminum tray and cooled to about 23° C to yield a hard brittle and generally pale yellow resin.

The following Table 1 more clearly demonstrates the individual recipes and resulting softening points according to ASTM No 28-58T.

TABLE 1

| Exp | Ratio Piperylene/ 2-methyl-2-butene | % α-methyl styrene | S.P. (°C) |
| --- | --- | --- | --- |
| A | 0.7/1 | 3 | 93 |
| B | 1.8/1 | 4 | 92 |
| C | 1.0/1 | 5 | 91.5 |
| D | 1.2/1 | 10 | 86 |
| E | 1/1 | 0 | 100.5 |

EXAMPLE II

Pressure-sensitive adhesives were prepared by mixing 20 parts of a resin prepared according to the method of Example I, 20 parts of an unvulcanized block copolymer of isoprene and styrene and 60 parts of toluene at 25° C. The pressure sensitives are identified herein as Experiments AA – EE to correspond with the resins of Experiments A – E of Example I. Experiment XX is a control using no tackifying resin. After the rubber and resin dissolved in the toluene, a one mil coating was spread on a polyester (polyethylene terephthalate) film. The coating was dried and the coating film laminate cut into test strips. The adhesive properties of the coating were tested utilizing methods of the Pressure Sensitive Tape Council, PSTC-6 for tack, and PSTC-1 for peel. The following results were obtained as shown in Table 2, indicating superior pressure sensitive adhesive properties.

Table 2

| Exp | % α-methyl styrene in basic resin | Tack (inches) | 180° peel (oz/onch) | Dynamic shear (psi) |
| --- | --- | --- | --- | --- |
| AA[1] | 3 | 0.5 | 66 | 38 |
| BB[1] | 4 | 0.88 | 75 | 33 |
| CC[1] | 5 | 1.0 | 62 | 64 |
| DD[1] | 10 | 0.75 | 64 | 35 |
| EE | 0 | 18.12 | — | — |
| XX | — | 3¾ | 66 | 35 |

[1]Unvulcanized block copolymers obtained as Kraton 1107, trademark of The Shell Chemical Company, as containing about 86 percent isoprene and correspondingly about 14 percent styrene by weight, a glass transition temperature of about −70° C and a tensile strength of about 1200 pounds per square inch with an elongation of about 1300 percent measured at 25° C and an intrinsic viscosity of 1.1 as measured in toluene at 30° C.

In this example, the 180° peel strength tests were conducted according to Method PSTC-1, revised in April of 1966, of the Pressure Sensitive Tape Council. This method is found in the Fifth Edition of "TEST METHODS FOR PRESSURE SENSITIVE TAPES" developed by the Pressure Sensitive Tape Council, 1201 Waukegan Road, Glenview, ILL. This test measures the average pull value required to peel the adhesive from the substrate at 180° angle in pounds per one inch width of the test sample. The PSTC-6 test involves measuring the distance a ball rolls across a horizontally positioned pressure-sensitive sample after rolling down a prepared inclined plane. The dynamic sheer strength was measured in this example by pulling a ½ square inch of tape from steel panel at a rate of 2 inches/min.

In the further practice of this invention, the adhesive composition can be adaptively applied as a hot melt, particularly when about 10 to about 40 parts by weight of a rubber processing-type oil is added to the composition, by applying the composition, as a hot melt, at about 140° C to about 190° C to a substrate, itself at a temperature of about 15° C to about 50° C, where the hot melt sets up on the substrate and transforms into a pressure-sensitive adhesive within about 10, preferably within about 5, seconds. In this aspect of the invention, it is important to appreciate that the hot melt is applied in the absence of the solvent, thereby enabling an essentially solvent-free method of preparing a pressure-sensitive adhesive coated substrate. In this regard, various rubber processing oils can be used, representative of which include, although are not limited to, mineral oil and naphthenic oils and other compatible oils generally used in the rubber processing art. Although it is conceivable that a hot melt be applied with the composition of this invention itself, it is generally desired that the rubber processing oils be added to aid in the initial fluidity of the hot melt and to enable a more efficient coating procedure.

While certain representative embodiments and details have been shown for the purpose of illustrating the invention, it will be apparent to those having skill in this art that various changes and modifications may be made therein without departing from the spirit or scope of the invention.

What is claimed is:

1. A rubber, α-methylstyrene-modified piperylene/2-methyl-2-butene resin adhesive composition which comprises an admixture of (1) about 100 parts by weight of a rubber comprised of at least one of natural rubber, synthetic cis-1,4-polyisoprene elastomer, and an unvulcanized elastomeric styrene/isoprene block copolymer having the general configuration A - B - A wherein each A is an independently selected nonelastomeric styrene polymer block having an average molecular weight of about 2,000 to about 100,000 and a glass transition temperature above about 25° C., the total block A content being from about 10 to about 50 percent by weight of the copolymer, and B is an elastomeric conjugated diene block of polyisoprene having an average molecular weight from about 25,000 to about 1,000,000 and a glass transition temperature below about 10° C., said copolymer having a tensile strength at 25° C. in excess of about 200 pounds per square inch, and (2) about 60 to about 140 parts by weight of a compatible piperylene/2-methyl-2-butene type, thermoplastic tackifying resin, modified with a minor amount of α-methylstyrene containing carbon-to-carbon unsaturation therein and having a softening point in the range of about 80° C. to about 105° C. prepared by the method which comprises reacting in the presence of an aliphatic hydrocarbon solvent and a catalyst selected from at least one of aluminum chloride and ethylaluminum dichloride, a monomer mixture consisting of about 92 to about 99 weight percent of a diolefin/olefin mixture of a weight ratio in the range of about 0.6/1 to about 1.4/1 and, correspondingly, about 8 to about 1 weight percent α-methylstyrene, where said diolefin is at least about 95 weight percent piperylene and said olefin is 2-methyl-2-butene; wherein said diolefin is optionally modified by containing up to about 5 weight percent isoprene and wherein said monomer mixture is optionally modified by containing up to about 10 weight percent of at least one monomer selected from the group consisting of piperylene dimers, piperylene trimers, 2-methyl-1-butene, 2-methyl-2-pentene, 2-methyl-1-pentene, 2,3-dimethyl-1-butene, 2,3-dimethyl-2-butene, 2-methyl-2-pentene, cyclopentene and 1,3-cyclopentadiene.

2. The adhesive composition of claim 1 where the diolefin/olefin ratio of said resin increases in accordance with any increase in the amount of α-methyl styrene.

3. The adhesive composition of claim 1 where the diolefin/olefin weight ratio of said resin ranges from about 0.8/1 to about 1.4/1 the α-methyl styrene is used in an amount of about 6 to about 2 weight percent, and where said olefin is comprised of at least about 90 weight percent 2-methyl-2-butene.

4. The adhesive composition of claim 3 where said resin is characterized by having a softening point in the range of about 85° C to about 105° C, where said resin is recovered from the polymerization mixture by first neutralizing the catalyst with a material selected from water, lime and at least one alcohol selected from methanol, isopropanol and butanol, followed by steam stripping the filtrate to remove volatiles.

5. The adhesive composition of claim 4 where, for said resin, said solvent is selected from hexane, heptane and unreacted hydrocarbons and the polymerization is conducted at a temperature in the range of about 10° C to about 50° C.

6. The adhesive composition of claim 5 where said elastomer is selected from natural rubber and a block copolymer of styrene/isoprene/styrene.

7. The adhesive mixture of claim 6, as a hot melt pressure sensitive adhesive, in admixture with about 10 to about 40 parts by weight of a rubber processing-type oil.

8. The adhesive composition of claim 1 where the diolefin/olefin weight ratio for the preparation of said resin ranges from about 0.8/1 to about 1.4/1 while the α-methyl styrene content correspondingly ranges from about 6 to about 2 weight percent, based on the total of diolefin, olefin and α-methyl styrene, where said olefin is comprised of at least 90 weight percent 2-methyl-2-butene and correspondingly contains up to about 10 weight percent of at least one material selected from piperylene dimers, piperylene trimers and other unsaturated reactive hydrocarbons selected from 2-methyl-1-butene, 2,3-dimethyl-1-butene, 2-methyl-1-pentene, 2-methyl-2-pentene, cyclopentene and 1,3-cyclopentadiene.

* * * * *